United States Patent [19]

Sutera et al.

[11] Patent Number: 4,667,207

[45] Date of Patent: May 19, 1987

[54] INK JET SYSTEM CATCHER STRUCTURE

[75] Inventors: Richard Sutera, Centerville; John L. Dressler, Spring Valley; Timothy H. Archer, Centerville, all of Ohio

[73] Assignee: Burlington Industries, Inc., Greensboro, N.C.

[21] Appl. No.: 875,881

[22] Filed: Jun. 13, 1986

[51] Int. Cl.[4] .......................... G01D 15/18; B05B 5/02

[52] U.S. Cl. ........................................ 346/75; 239/693

[58] Field of Search ........................... 346/75; 239/693

[56] References Cited

U.S. PATENT DOCUMENTS

| | | | |
|---|---|---|---|
| 3,777,307 | 12/1973 | Duffield | 346/75 |
| 3,813,675 | 5/1974 | Steffy et al. | 346/75 |
| 3,836,914 | 9/1974 | Duffield | 346/75 |
| 3,936,135 | 2/1976 | Duffield | 346/1.1 |
| 4,007,464 | 2/1977 | Bassous et al. | 346/75 |
| 4,238,805 | 12/1980 | Paranjpe et al. | 346/75 |
| 4,240,082 | 12/1980 | Yu | 346/75 |
| 4,250,510 | 2/1981 | Dressler | 346/75 |
| 4,268,836 | 5/1981 | Huliba et al. | 346/75 |
| 4,280,130 | 7/1981 | Slemmons | 346/75 |
| 4,283,730 | 8/1981 | Graf | 346/75 |
| 4,286,274 | 8/1981 | Shell et al. | 346/75 |
| 4,292,640 | 9/1981 | Lammers et al. | 346/75 |
| 4,308,543 | 12/1981 | Shultz | 346/75 |
| 4,318,111 | 3/1982 | Damouth | 346/75 |
| 4,347,520 | 8/1982 | Paranjpe et al. | 346/75 |
| 4,417,256 | 11/1983 | Fillmore et al. | 346/75 |

*Primary Examiner*—E. A. Goldberg
*Assistant Examiner*—Gerald E. Preston
*Attorney, Agent, or Firm*—Nixon & Vanderhye

[57] ABSTRACT

A drop-catching structure for use in a liquid jet printing apparatus of the type which generates a linear array of closely spaced (i.e., high density) droplet streams from an orifice plate. The droplets are deflected from a normal droplet path towards a catching structure, the preferred embodiment of which includes an upper first planar surface substantially parallel to the droplet path, an intermediate planar surface disposed below the first planar surface and inclined downwardly and outwardly relative to the first planar surface, and a lower planar surface disposed below the intermediate surface which terminates in an upwardly directed channel defined with the ingesting blade.

40 Claims, 8 Drawing Figures

INK JET SYSTEM CATCHER STRUCTURE

FIELD OF THE INVENTION

The present invention generally relates to noncontact fluid printing devices conventionally known as "ink jet" or "fluid jet" printers and, more particularly, to a drop catcher design for an ink jet printing apparatus which may be used to capture deflected, closely spaced, i.e., high-density, droplet streams issuing from an orifice plate.

BACKGROUND AND SUMMARY OF THE INVENTION

Noncontact printers which utilize charged droplets are generally known in the art as shown by U.S. Pat. Nos. 3,373,437 to Sweet et al; 3,560,988 to Crick; 3,579,721 to Kaltenbach; and 3,596,275 to Sweet. Typically, fluid filaments of ink, dye or the like pass through the orifices of an orifice plate having an array of individually-controllable electrostatic charging electrodes disposed downstream of the orifice plate along the "droplet formation zone." In accordance with known principles of electrostatic induction, each fluid filament assumes an electrical charge opposite in polarity but related in magnitude to the electrical charge of its respective charging electrode. When a droplet of fluid separates from the filament, an induced electrostatic charge, a scalar quantity is trapped in the droplet. Subsequently, the charged droplet passes through an electrostatic field, a vector quantity. The electric field is oriented so that the droplet is deflected from the normal path towards the droplet catching structure. Uncharged droplets proceed along a normal path and are deposited upon a receiving substrate. Typical prior art ink jet printing systems use a random droplet system whereby droplets in a linear array break off naturally in accordance with Rayleigh distribution formulae or as a result of randomly-applied energetic stimulation.

A problem exists with droplet catching structures used in prior art ink jet systems in that such structures have not been as effective as desired in applications requiring the capture of closely spaced, high-density droplet streams. It is desirable that the catcher face be designed such that the individual droplet streams will "wet out" the surface of the catcher structure as they impact on the face to form a uniform, adhering film of liquid which will follow the profile of the drop catcher face. If the jets are closely spaced, i.e., in a "high-density" configuration, it becomes virtually impossible to form the desired uniform layer of liquid on the catcher structure because the droplets tend to "spill off" the face, thereby destroying the regularity and clarity of images formed on the receiving substrate. The problem is particularly acute in systems using a catcher face structure which is substantially vertical or inclined downwardly to only a small degree in the direction toward the normal path of droplet flow.

Similarly, for high-density orifice applications in which the catcher face is inclined to a greater extent, i.e., more oblique to the path of droplet flow, the momentum of the individual droplets becomes too great and the droplet streams tend to create a "splash back" or "misting" condition. Such misting occurs at or near the point of contact with the catcher face and tends to collect upon the electrodes, the print, and other areas of the fluid jet device to the detriment of the overall printing operation.

An additional problem exists with prior art drop catcher structures in that their effectiveness depends to a significant degree on the ink jet pressure exerted on droplet streams issuing from the orifice plate. That is, a configuration which is acceptable for a particular ink jet pressure may not be satisfactory at a higher pressure due to the increase in momentum of droplets issuing from the orifice plate. In addition, at elevated pressures, the possibility that splashback will occur is significantly greater.

The present invention substantially alleviates the above problems by providing a drop catcher structure for capturing deflected, closely adjacent, i.e., high-density, droplet streams issuing from an orifice plate with little or no loss of clarity or uniformity of images formed on the receiving substrate.

It has now been found that high density droplet streams issuing from an orifice plate can be effectively caught using a catcher face configuration having at least three separate but interrelated surfaces. The various embodiments contemplated by the present invention each share a common structural feature—a planar drop-catching surface which is inclined downwardly in a direction towards the vertical path of droplet streams issuing from the orifice plate. It has been found that the amount of inclination for high-density droplet streams should range between 8° and 70° relative to the normal path of droplet flow, depending on the fluid pressure. By using a drop catcher face having such downward inclination—that is, a planar surface sloped toward the droplet path—the high-density droplet streams deflected onto the surface will effectively "wet out" the surface of the catcher face to form a uniform flowing layer of liquid which will follow the profile of the drop catcher face into the ingesting blade and a suitable vacuum slot.

In exemplary embodiments using a catcher face structure in accordance with the present invention, the droplets issue from a linear array of orifices having a spacing in the range of between 5 mils and a diameter of about 1.3 mils to a spacing of approximately 14 mils and a diameter of about 4 mils, and are guided electrostatically by planar electrode means which provide a transverse deflection field through which the droplets pass. An individual droplet is thus either deflected by the transverse deflection field and caught on the catcher face or permitted to continue on to strike the receiving substrate.

It has now been found that for certain embodiments of the present invention. particularly those used in printing applications for rugs, carpets and the like, individual ink droplets which strike a catcher face having a downward and outward inclination of less than 12° (for an ink jet pressure of approximately 15 pounds per square inch), tend to "skip off" the fluid film that forms on the catcher face and thus not be caught by the catcher. At angles greater than 12° but less than 24° (and an ink jet pressure of approximately 15 PSI), the individual jets are cleanly caught and a film of liquid forms around the front lip portion of the catcher structure.

In other embodiments of the present invention. particularly those suitable for solid shade applications on lighter weight textile fabrics, it has been found that if the individual droplets strike a catcher facing having a downward and outward inclination of between 26° and 70° (preferably 30°) for ink jet pressures in the range of 2 to 5 PSI, the individual jets will not splash or "skip off" the catcher face and will be cleanly caught by the catcher structure. Within that preferred range of surface inclinations, the resulting fluid film remains uniform and stable and forms a smooth flowing layer of liquid which follows the profile of the catcher face into the vacuum slot.

The momentum of individual droplets in the direction parallel to the catcher face must not, however, exceed certain levels depending upon the total kinetic energy of the stream, the droplet size and surface tension of the droplets. Thus, if the pressure of the ink jets is increased (thereby increasing the total momentum of the droplets), the angular position of the catcher structure will change. At higher ink jet pressures, catcher structures in accordance with the invention must use lower angles of inclination. For example, at a 30 PSI ink jet pressure, the preferred angle of inclination relative to the path of droplet flow will be approximately 8° with a maximum possible angle of inclination of only 16°. In contrast, for low pressure applications in the range of 2–5 PSI, the angle of inclination may be as high as 70° due to the reduced velocity of the ink droplets.

Thus, it is an object of the present invention to provide for an improved catcher structure for ink jet systems using closely spaced, i.e., high-density, jets such as those used in random droplet systems.

It is a further object of the present invention to provide an ink jet catcher system in which high-density deflected droplets are caught by the catcher face to form an adhering film of fluid flowing down the front face of the catcher structure.

It is still a further object of the present invention to provide a catcher structure which will prevent "splash-back" or "misting" of deflected droplets which would otherwise destroy the reliability of the printing operation and affect the clarity of the print on the receiving substrate.

It is still a further object of the present invention to provide a catcher structure which will operate effectively over a wider range of ink jet pressures.

INFORMATION DISCLOSURE STATEMENT

Attention is directed to the publications discussed below as examples of possibly relevant prior art.

Drop catching surfaces are generally known in the art as evidenced by the following United States patents: U.S. Pat. Nos. 3,777,307 to Duffield; 3,836,914 to Duffield; 3,813,675 to Steffy et al; 3,936,135 to Duffield; 4,347,520 to Paranjpe et al; 4,238,805 to Paranjpe et al; 4,283,730 to Graf; 4,007,464 to Bassous et al; 4,240,082 to Yu; 4,286,274 to Shell et al; 4,292,640 to Lammers et al; 4,308,543 to Shultz; 4,318,111 to Damouth; 4,280,130 to Slemmons and 4,268,836 to Huliba et al.

Duffield '307 discloses a droplet catcher which includes a convex catching surface having a first portion sloping backwardly away from the paths of the drop streams and a second curved portion which has a single radius of curvature to define a surface curving downwardly and inwardly to carry liquid from the first backwardly sloping portion to the ingesting blade.

Duffield '914 discloses a convex drop-catching surface which, like Duffield '307, includes a first portion sloping backwardly away from the path of the droplet streams and a second portion curving downwardly and inwardly to carry liquid from the first portion to the ingesting blade. The second portion, however, is configured so that the part adjacent to the blade is curved in a smaller radius than the part adjacent to the first portion. An intermediate convex curve is provided between the backwardly sloped portion and the smaller-radius convexly curved portion.

Steffy et al '675 discloses a vertical drop-catching face having parallel grooves formed in the face in registry with the droplet streams. Thus, deflected droplets impinging on the vertical face are captured in the channels and then flow to the ingesting blade.

Duffield '135 discloses a conventional drop-catching device which defines a substantially vertical planar surface terminating in a relatively small-radius lower lip. A meniscus is continuously provided in the channel defined between the lower lip and the ingestion blade.

Paranjpe et al '520 and Paranjpe et al '805 disclose a pair of catchers each of which defines a drop-catching vertical surface and a drop ingesting slot along the lower edge of the drop-catching surface. Each of the catchers is pivotally mounted for rotation about an axis parallel to rows of droplet streams so that the drop-catching surface can be pivotally moved into and out of a drop-catching position relative to the streams.

Graf '730 discloses an "electrodeless" droplet printing system which includes a convex continuously curved catching surface.

Bassous et al '464 discloses a droplet catcher having a substantially planar drop-catching surface disposed parallel to a stream of generated droplets The drop-catching surface terminates in a small-radius lip to define a channel to catch deflected droplets.

Yu '082 discloses a tubular droplet catching structure which includes a slot to allow deflected drops to pass through to the interior of the tube.

Shell et al '274 discloses a droplet catcher having a projection surface in alignment with the path of deflected droplets and against which the droplets strike. Deflected droplets impinge upon a sensor which generates varying electrical signals to control the ink droplet deflection and thus the impact position of the droplets on the sensor.

Lammers et al '640 discloses a droplet-catching structure having a substantially vertical face which includes a backwardly sloped portion to define a channel to accept deflected drops.

Shultz '543 includes a gutter which is concentric with a lower deflection plate and a gutter lip which defines a concave surface relative to the droplet path.

Damouth '111 discloses a conventional drop-catching structure which includes a vertical drop-catching face that terminates in an inwardly curved lip to carry the deflected droplets to an ingesting blade.

Slemmons '131 utilizes the "slotted" drop-catching vertical surface more particularly described in Steffy et al '675.

Huliba et al '836 utilizes a substantially vertical drop-catching surface and an ingesting slot beneath the drop-catching surface having a plurality of internal catcher cavities.

The present invention deviates from the above prior art drop catcher constructions in that it allows high-density droplet streams deflected onto the surface of the catcher to "wet out" the surface of the catcher to form a flowing layer of liquid which will follow the profile of the drop catcher face.

For ink jet pressures of about 15 pounds per square inch, an orifice spacing of 5 mils and an orifice diameter of 1.3 mils, the catcher surface should be inclined downwardly and in a direction towards the path of droplet flow between 12° and 24°. with an optimum angle of inclination of 18°. If the pressure of the jets is increased to 30 pounds per square inch, the angle of inclination relative to the normal path of droplet flow ranges between 8° and 16°. For "low pressure" applications in the range of 2–5 PSI. the inclination angle may range from 26° to 70° relative to the normal path of droplet flow.

There are seven exemplary embodiments of drop-catching structures in accordance with the invention. The first five embodiments are particularly useful for printing applications for carpets, rugs and the like in which the ink jet pressure is maintained at about 15 PSI and the droplets issue from a linear array of orifices having a spacing of approximately 5 mils and a diameter of about 1.3 mils. The sixth and seventh embodiments are particularly useful in so-called "low pressure" applications in the range of 2 to 5 PSI with a linear array of orifices having a spacing of approximately 14 mils and diameters of about 4 mils.

A first preferred embodiment of the invention utilizes three planar surfaces to establish the front face profile of the drop catcher structure. The first (uppermost) surface is substantially vertical, i.e., substantially parallel to the path of droplet flow, and terminates in an inclined second planar surface, the latter being the drop-catching surface. The first surface is enlarged (as compared to the other surfaces) and laterally displaced relative to the droplet path. As such it is positioned in a parallel confronting relationship with the planar deflecting electrodes. The first planar surface in conjunction with the deflecting electrode, thus serves to substantially create a transverse deflection field to effect deflection control of individual droplets. The second planar surface is downwardly and outwardly inclined in that it protrudes from the first vertical surface in a direction towards the normal droplet path at an angle of about 18°. It terminates in the third planar surface which is downwardly and inwardly inclined at an angle of approximately 7° relative to the second planar surface. The third surface terminates in an upwardly directed channel defined with a preferably porous ingesting blade which receives the film of flowing liquid.

This first embodiment of the invention has an additional advantage over prior art structures in that the porous ingesting blade is partially incorporated in the body of the catcher structure itself, thereby reducing the vertical distance from the orifice plate to the substrate being printed. Such reduction in vertical distance serves to minimize any misregistration caused by off-angle droplets, prevents any stray deflection of droplets, and tends to improve the overall clarity of the printed substrate. In prior art structures, the ingesting blade normally comprises a separate member disposed below the horizontal vacuum slot.

A second embodiment of the catcher structure in accordance with the present invention also includes a substantially vertical uppermost planar surface, a downwardly and outwardly inclined intermediate second planar surface (the drop-catching surface) and an inwardly inclined third surface which terminates in a channel defined with the ingesting blade. Unlike the first embodiment, however, the porous ingesting blade lies entirely below the lower edge of the fluid guiding surface. The upper forward edge of the blade lies near and parallel to the lower and outer edge of the fluid guiding surface such that the two edges together define the entrance to a horizontal rather than upwardly inclined channel.

A third embodiment of the invention utilizes a substantially vertical first surface which is also laterally displaced relative to the droplet stream and terminates in a downwardly and outwardly inclined planar drop-catching surface. The second intermediate planar surface terminates in a large-radius surface which directs the stream of deflected droplets into a channel defined with the ingesting blade.

The fourth embodiment of the invention also utilizes three planar surfaces to establish the front face profile of the drop catcher. Unlike the first three embodiments, however, the first (uppermost) droplet-catching surface is inclined towards the path of droplet formation and terminates in a short intermediate substantially vertical planar surface. This second vertical surface connects with a third planar surface which is downwardly and inwardly inclined approximately 25°, and terminates in a channel formed with the ingesting blade to accept the flowing liquid. Again, the edge of the ingesting plate is near the lowest edge of the fluid guiding surface of the catcher structure, such that together they define the entry to a horizontal channel.

A fifth embodiment of the present invention utilizes four rather than three planar surfaces to establish the front face profile of the drop catcher. As in embodiment four, the first (uppermost) planar surface serves as the drop-catching surface and is downwardly inclined n a direction toward the normal path of droplet flow. The second intermediate planar surface is substantially vertical and terminates in a third planar surface, the latter being inwardly inclined relative to the second vertical planar surface. A fourth planar surface is also downwardly and inwardly inclined thereby forming a V-shaped profile with the third surface. The fourth surface terminates in a horizontal channel defined with the ingesting blade.

A sixth embodiment of the invention utilizes a substantially vertical first planar surface which is laterally displaced relative to the normal path of droplet flow and terminates in a downwardly and outwardly inclined planar drop-catching surface. The second intermediate planar surface terminates in a third, large-radius surface which is convex toward the normal path of droplet flow and inclined downwardly and inwardly, i.e., away from the droplet path. Unlike the third embodiment, the intermediate large-radius surface terminates in a fourth convex radius surface at its lower end which directs the stream of deflected droplets into a channel defined with the ingesting blade.

A seventh embodiment of the invention also utilizes a substantially vertical first planar surface which is laterally displaced relative to the droplet stream and terminates in a downwardly and outwardly inclined planar drop-catching surface. The second intermediate planar surface terminates in an inwardly-inclined third planar surface. Unlike embodiment three, the third intermediate planar surface terminates in a curved, tight-radius fluid guiding surface which directs the stream of deflected droplets into an upwardly inclined channel defined with the ingesting blade. Embodiment seven also differs from the previous embodiments in that the substantially vertical first planar surface is longer, thereby increasing the length of the vertical space defined by the first planar surface and deflection electrode. As such, embodiment seven improves the deflection control of droplets by further stabilizing the charging field, and it is particularly useful in "low pressure" applications such as solid shade printing operations. Like embodiment six, the ingesting blade is tucked into the catcher structure itself and thus, the lower edge of the blade is not tangent to the lower curvature of the fluid guiding surface.

BRIEF DESCRIPTION OF THE ACCOMPANYING DRAWINGS

Reference will be hereinafter made to the accompanying drawings wherein like reference symbols throughout the various figures denote like structural elements, and wherein.

DETAILED DESCRIPTION OF THE PRESENTLY PREFERRED EXEMPLARY EMBODIMENT

Figure 1:
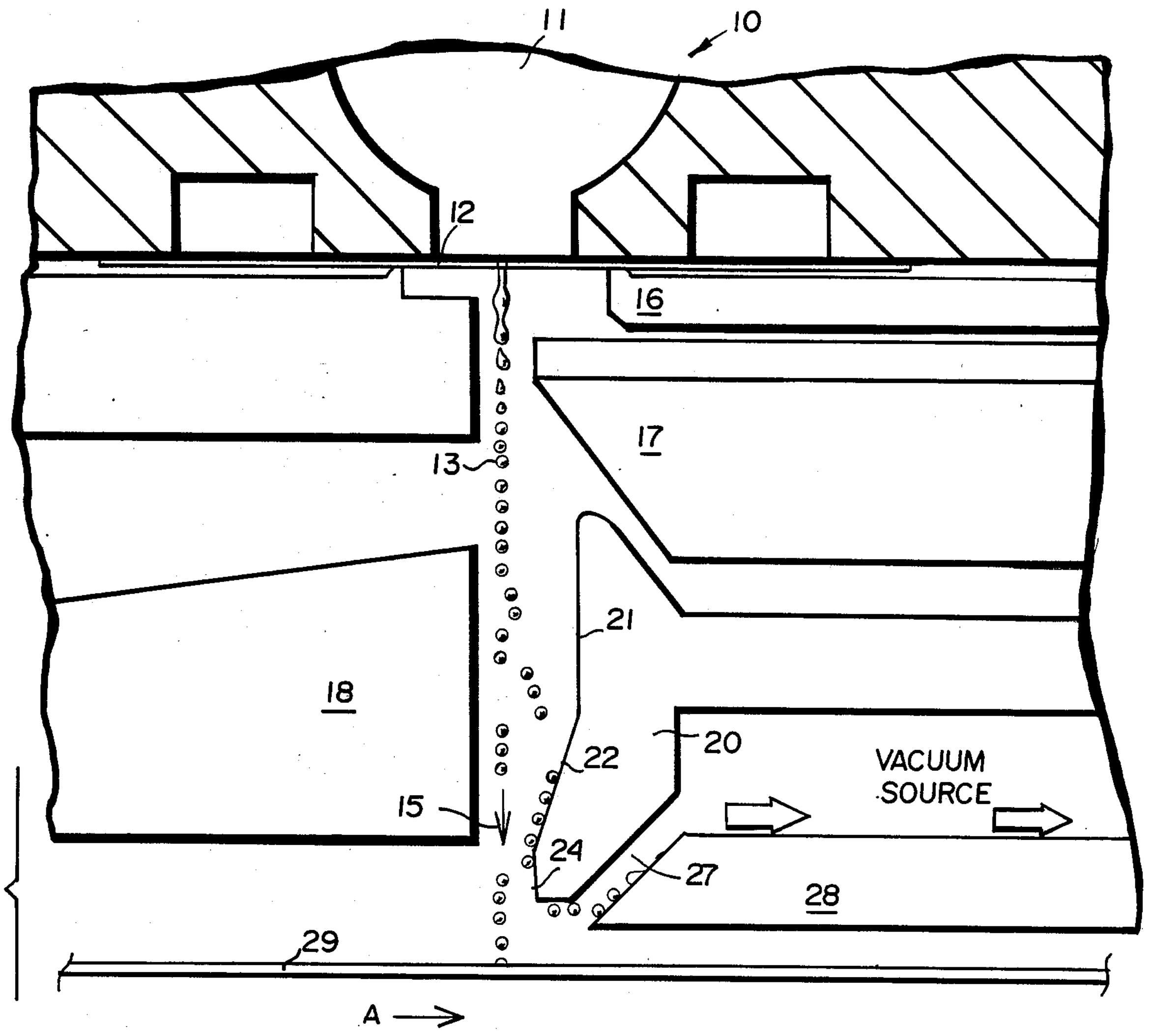
FIG. 1 is an elevational view of a fluid jet printing apparatus utilizing a droplet catcher structure in accordance with the present invention.

As shown in FIG. 1, a fluid jet apparatus 10 in accordance with the invention generally includes a printhead 11 having an orifice plate 12 through which a linear array of fluid streams issue so as to generate a sequential plurality of droplets 13 which proceed along a normal droplet flight path (shown by arrow 14) toward a print medium 29 moving in the direction indicated by arrow A. Selected droplets are charged by means of charge electrode 16 having support structure 17 such that when the selected charged droplets pass through a deflection field generated by deflection electrode 18, the charged droplets will be deflected from the normal droplet flight path 15 towards droplet catching structure 20. Uncharged droplets, on the other hand, proceed along droplet flight path 15 so as to be deposited upon the receiving substrate 29.

The preferred drop catcher structure exemplified in FIG. 1 (and as shown in greater detail in FIG. 2) is joined to a lower end of the charging field and includes a substantially vertical first planar surface 21 which terminates in an intermediate second planar surface 22. This second surface is downwardly and outwardly sloped relative to planar surface 21 and thus is sloped toward the path of droplet streams 13 issuing from the orifice plate. Planar surface 22 terminates in a third planar surface 24 which is inwardly inclined relative to planar surface 22 and which defines an upwardly directed channel 27 with ingesting blade 28. Channel 27 is connected to a vacuum source so that accumulated ink can be continuously removed as it follows the profile of the drop catcher face.

Substantially vertical planar surface 21 maintains a uniform deflecting field generated by the deflection electrode thereby preventing any non-uniform deflection of drops 13. The inclination of planar surface 22 also permits the droplets to be captured without any splattering or "misting" effect so that a uniform flowing film of ink is continuously transferred from surface 24 into channel 27.

Figure 2:
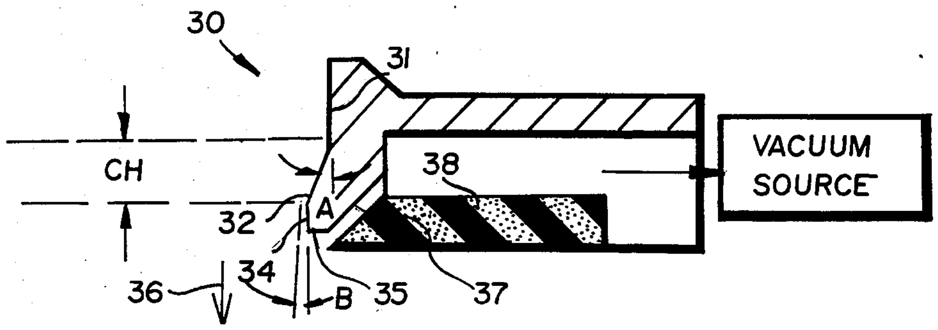
FIG. 2 is a cross-sectional elevational view of the preferred droplet catcher structure utilized to catch deflected droplets in accordance with the invention.

FIG. 2 of the drawings depicts the preferred embodiment of the drop catcher structure in accordance with the invention and is shown generally as 30. Three distinct planar surfaces establish the front face profile of the catcher. The uppermost surface, designated as 31, is substantially vertical and terminates with second planar surface 32, the latter being the drop-catching surface. Vertical surface 31 is laterally displaced relative to the droplet streams to thereby substantially equalize the deflection field generated by the deflection electrode (not shown). Intermediate second planar surface 32 is downwardly and outwardly inclined relative to vertical surface 31, i.e., in a direction toward the normal droplet path (shown by arrow 36), and terminates in third planar surface 34. This third surface is downwardly and inwardly inclined approximately 7° relative to droplet path 36 and terminates in upwardly directed channel 37 defined with ingesting blade 38. The outwardly and downwardly inclined planar surface 32 is inclined relative to vertical surface 31 by approximately 18°.

FIG. 2 also illustrates three important parameters for drop catcher structures in accordance with the invention. In particular, angle A depicts the amount of inclination of the drop catcher face. Angle A is believed to be the most critical design parameter and is determined empirically by the orifice diameter, jet velocity, surface tension and viscosity of the liquid droplets. Angle B, which is also determined empirically, represents the amount of inclination for the lowest planar surface which terminates in upwardly directed channel 37 and is considered less critical to the overall performance of the catcher structure. Likewise, dimension C is considered significant but less critical than Angle A and depicts the preferred height of the drop catcher surface. The various angles and dimensions defining the planar surfaces of catcher structures in accordance with the present invention are summarized in Table I below.

TABLE I[1]

| Embodiment | Angle A | Angle B | Dimension CH (inches) | Figure |
|---|---|---|---|---|
| 1 | 18° | 7° | .091 | 2 |
| 2 | 18° | 7° | .091 | 3 |
| 3 | 25° | — | .045 | 4 |
| 4 | 12° | 25° | .227 | 5 |
| 5 | 12° | 25° | .182 | 6 |
| 6 | 30° | — | .100 | 7 |
| 7 | 30° | 7° | .240 | 8 |

Notes:
[1]For an ink jet pressure of 15 PSI

Figure 3:
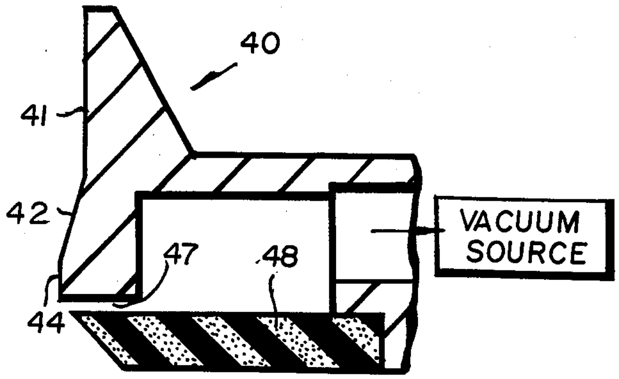
FIGS. 3, 4, 5, 6, 7 and 8 are cross-sectional elevational views of alternative exemplary embodiments of droplet catcher structures in accordance with the invention.

In the preferred embodiment of the invention, the distance from the orifice plate to the receiving substrate has been reduced by tucking porous ingesting blade 38 into the body of the catcher structure itself, thereby minimizing any misregistration caused by off-angle droplets and any stray deflection of droplets. As FIG. 2 indicates, the edge of ingesting blade 38 is not in line with the lower slope 35 of the fluid guiding surface of the catcher structure. With particular reference to FIG. 3 of the drawings, a second embodiment of the present invention is shown generally as 40 and utilizes three planar surfaces to define the front face profile of the droplet catcher. First surface 41 is substantially vertical and laterally displaced relative to the normal droplet path and thus serves to substantially equalize the deflection field to effect grater deflection control of the droplets. Vertical face 41 terminates in a downwardly and outwardly inclined planar drop-catching surface 42 which protrudes from first vertical surface 41 in a direction towards the droplet stream. This second embodiment also includes an inwardly inclined third planar surface 44 which terminates in a channel 47 defined with ingesting blade 48. The angle of third planar surface 44 is approximately 7° relative to first planar surface 41. The second outwardly and downwardly inclined planar surface 42 is inclined relative to uppermost vertical surface 41 by approximately 18°. Unlike the first embodiment, the edge of ingesting blade 48 is essentially in line with the slope of inwardly inclined surface 44 and defines a horizontal rather than upwardly directed channel 47.

Figure 4:
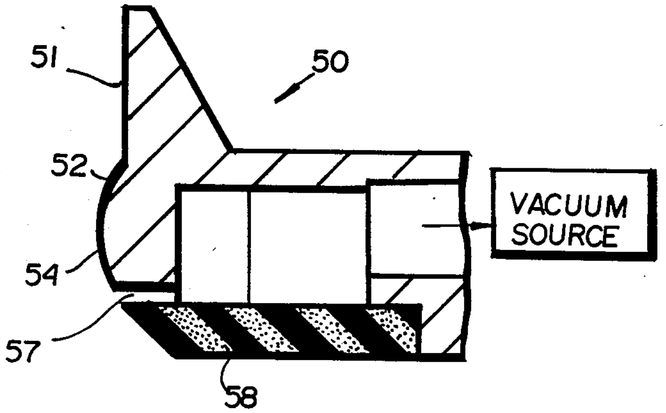

FIG. 4 of the drawings depicts a third embodiment of a catcher structure in accordance with the invention (shown generally as 50) in which first surface 51 is substantially vertical and laterally displaced relative to the normal path of the droplet streams. Vertical face 51 terminates in downwardly and outwardly inclined planar surface 52 which serves as the drop-catching surface. Planar surface 52 terminates in a large-radius surface 54 convex toward the normal droplet path. Curved surface 54 serves to direct the flowing film of deflected droplets into channel 57 defined with ingesting blade 58. As in embodiment two, the edge of ingesting blade 58 is in line with, i.e., tangent to, the lower curvature of fluid guiding surface 54.

Figure 5:
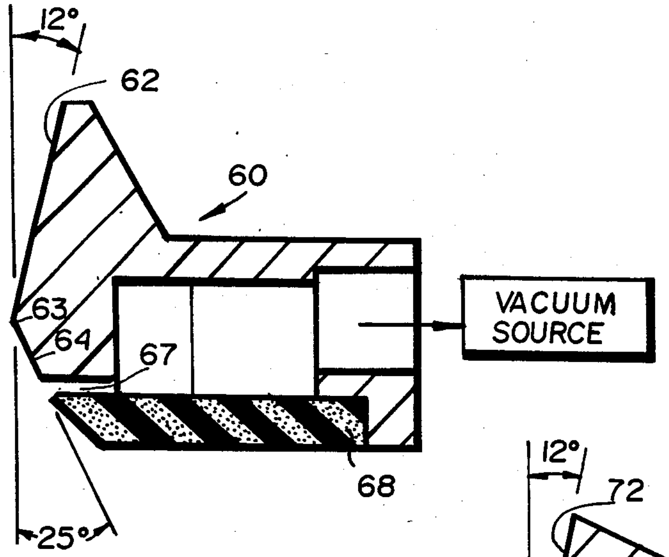

A fourth embodiment of the present invention is shown in FIG. 5 and also utilizes three planar surfaces to establish the front face profile of the drop catcher structure (shown generally as 60). However, the uppermost surface 62 is not vertical but is downwardly and outwardly inclined relative to the normal path of droplet flow by approximately 12°. The second intermediate planar surface 62 is substantially vertical and terminates with third planar surface 64, the latter being downwardly and inwardly inclined relative to intermediate planar surface 63 at an angle of approximately 25°. The edge of ingesting plate 68 is in line with the slope of surface 63 and defines horizontal channel 67.

Figure 6:
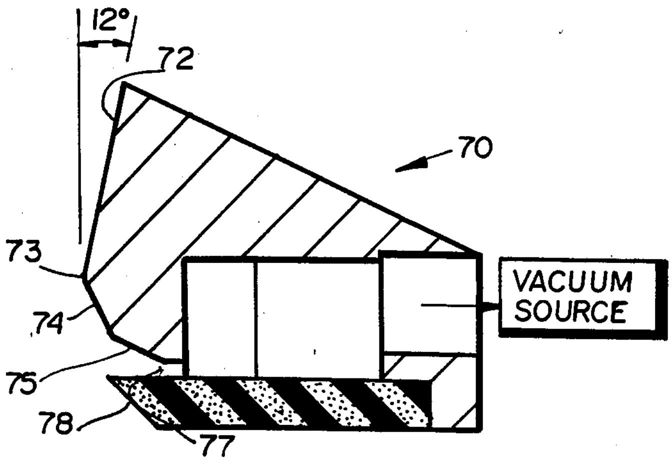

FIG. 6 of the drawings depicts a fifth alternative embodiment of the invention (shown generally as 70). This last embodiment utilizes four rather than three planar surfaces and is similar to embodiment 4 in that the drop catcher face is defined by an uppermost droplet catching surface 72 which is downwardly and outwardly inclined relative to the normal path of droplet flow by an angle of about 12°. The uppermost surface terminates in a short intermediate substantially vertical planar surface 73 which terminates in an inwardly inclined (e.g., by about 25°) third planar surface 74. A fourth planar surface 75 forms a V-shaped profile with third surface 74 and terminates in horizontal channel 77 defined with ingesting blade 78.

Figure 7:
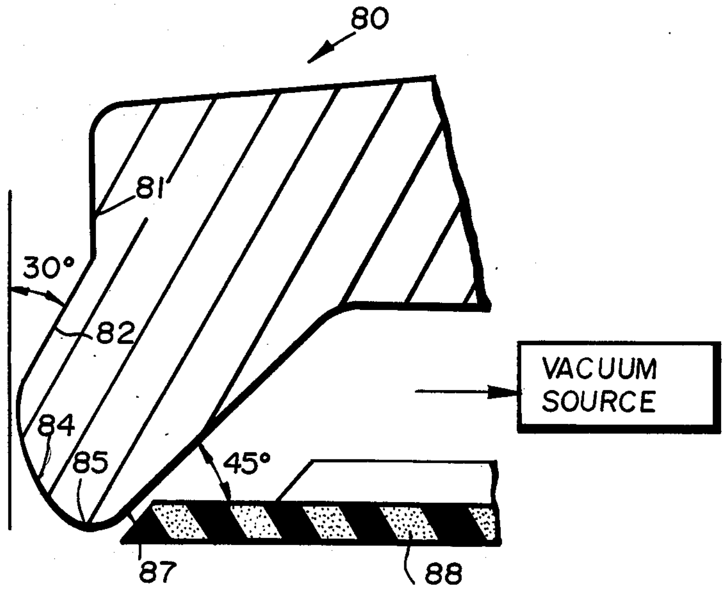

FIG. 7 of the drawings depicts the sixth embodiment of a catcher structure in accordance with the invention (shown generally as 80). As indicated above, this particular embodiment is useful in solid shade applications in which the ink jet pressure is in the range of between 2 to 5 PSI and the droplets issue from a linear array of orifices having a spacing of approximately 14 mils and a diameter of about 4 mils.

First surface 81 is substantially vertical and laterally displaced relative to the normal path of droplet flow. Vertical face 81 terminates in downwardly and outwardly inclined planar surface 82 which serves as the drop-catching surface. Planar surface 82 terminates in an intermediate large-radius surface 84 which is convex toward the normal droplet path but inclined downwardly and inwardly relative to the droplet stream. Convex surface 84 terminates in a second convex radius surface 85 which is curved downwardly with a slightly smaller radius than convex surface 84. Surface 85 serves to direct the flowing film of deflected droplets into channel 87 defined with ingesting blade 88. Unlike embodiment 3, the edge of ingesting blade 88 is not in line with, i.e., not tangent to, the lower curvature of fluid guiding surface 84.

Figure 8:
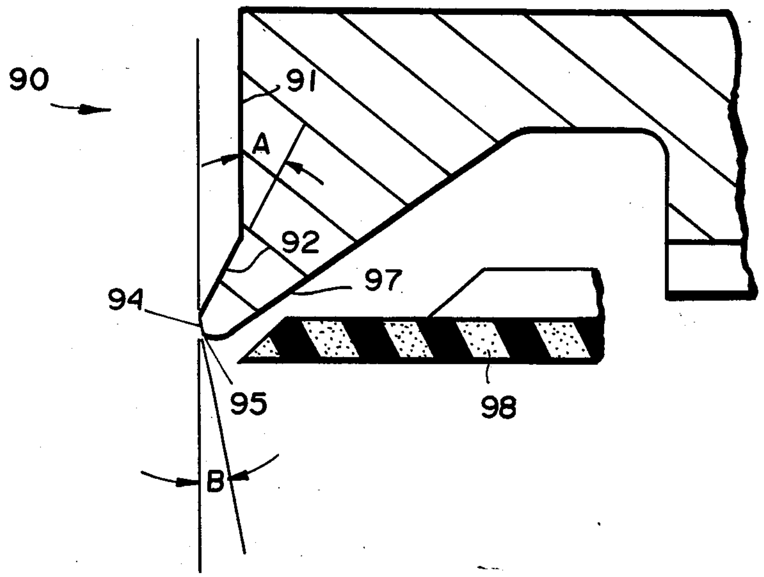

FIG. 8 of the drawings depicts the seventh embodiment of a catcher structure in accordance with the invention (shown generally as 90) in which first surface 91 is substantially vertical and laterally displaced relative to the normal path of the droplet streams. Vertical face 91 terminates in downwardly and outwardly inclined planar surface 92 which serves as the drop-catching surface. Planar surface 92 terminates in a third planar surface 94 which is downwardly and inwardly inclined approximately 7° relative to the normal path of droplet flow. The third planar surface terminates in a tight-radius fluid guiding surface 95 which is convex toward the normal droplet path. Curved surface 95 serves to direct the flowing film of deflected droplets into upwardly inclined channel 97 defined with ingesting blade 98. As in embodiment six, the edge of ingesting blade 98 is not tangent to the lower curvature of fluid guiding surface 95.

While the present invention has herein been described in what is presently believed to be the most preferred embodiments thereof, those in the art will recognize that many modifications may be made while retaining many of the novel features of this invention, which modifications shall be accorded the broadest scope of the appended claims so as to encompass all equivalent structures and/or assemblies.

What is claimed is:

1. A drop-catching structure for use in a liquid jet printing apparatus of the type generating a linear array of droplet streams under pressure and deflecting selected droplets from a normal droplet path towards a drop-catching structure, said drop-catching structure comprising:

an ingesting blade, and means defining a drop-catching surface for catching deflected droplets, said drop-catching surface including (a) an upper substantially vertical first planar surface; (b) an intermediate planar surface disposed below said first planar surface and sloped downwardly and in a direction toward said normal droplet path; and (c) a lower planar surface disposed below said intermediate surface and sloped downwardly and in a direction away from said normal droplet path, said drop-catching surface being effective for carrying a flowing layer of said deflected droplets from said intermediate planar surface to said ingesting blade.

2. A drop-catching structure according to claim 1, wherein said intermediate planar surface is sloped at an angle of between 8° and 70° relative to said normal droplet path.

3. A drop-catching structure according to claim 1, wherein said droplet streams are generated under a pressure of about 15 PSI and wherein said intermediate planar surface is sloped at an angle of between 12° and 24° relative to said normal droplet path.

4. A drop-catching structure according to claim 1, wherein said droplet streams are generated under a pressure of about 30 PSI and wherein said intermediate planar surface is sloped at an angle of between 8° and 16° relative to said normal droplet path.

5. A drop-catching structure according to claim 1, wherein said lower planar surface is sloped at an angle of about 7° relative to said normal droplet path.

6. A drop-catching structure according to claim 1, wherein said lower planar surface terminates in an upwardly directed channel defined with said ingesting blade for receiving said flowing layer of deflected droplets.

7. A drop-catching structure according to any one of claims 1, 2, 3, 4 or 5, wherein said lower planar surface and said ingesting blade define a channel for receiving said flowing layer of deflected droplets, and wherein the forward edge of said ingesting blade is not tangent to the lower edge of said lower planar surface.

8. A liquid jet printing apparatus of the type generating a linear array of droplet streams under pressure and deflecting selected droplets from a normal droplet path towards a drop-catching structure according to claim 1, wherein said liquid jet printing apparatus generates said array of droplet streams under pressure through an orifice plate, said orifice plate having a linear array of orifices with diameters of 1 to 2 mils.

9. A drop-catching structure for use in a liquid jet printing apparatus of the type generating a linear array of droplet streams under pressure and deflecting selected droplets from a normal droplet path towards a drop-catching structure, said drop-catching structure comprising;

an ingesting blade, and means defining a drop-catching surface for catching deflected droplets, said drop-catching surface including (a) an upper substantially vertical first planar surface; (b) an intermediate planar surface disposed below said first planar surface and sloped downwardly and in a direction toward said normal droplet path; and (c) a radius surface disposed below said intermediate planar surface and being curved in a direction away from said normal droplet path, said drop-catching surface being effective for carrying a flowing layer of said deflected droplets from said intermediate planar surface to said ingesting blade.

10. A drop-catching structure according to claim 9, wherein said intermediate planar surface is sloped at an angle of 25° relative to said normal droplet path.

11. A drop-catching structure according to claim 9, wherein said radius surface has a curvature of about 0.250 inch in a direction away from said normal droplet path.

12. A drop-catching structure according to claim 9, wherein said radius surface terminates in a channel defined with said ingesting blade for receiving said flowing layer of deflected droplets.

13. A liquid jet printing apparatus of the type generating a linear array of droplet streams under pressure and deflecting selected droplets from a normal droplet path towards a drop-catching structure according to claim 9, wherein said liquid jet printing apparatus generates said array of droplet streams under pressure through an orifice plate, said orifice plate having a linear array of orifices with diameters of 1 to 2 mils.

14. A drop-catching structure for use in a liquid jet printing apparatus of the type generating a linear array of droplet streams under pressure and deflecting selected droplets from a normal droplet path towards a drop-catching structure, said drop-catching structure comprising:

an ingesting blade, and means defining a drop-catching surface for catching deflected droplets, said drop-catching surface including (a) an upper first planar surface sloped downwardly and in a direction toward said normal droplet path; (b) an intermediate planar surface disposed below said first planar surface and substantially parallel to said normal droplet path; and (c) a lower planar surface disposed below said intermediate surface and sloped downwardly and in a direction away from said normal droplet path, said drop-catching surface being effective for carrying a flowing layer of said deflected droplets from said first planar surface to said ingesting blade.

15. A drop-catching structure according to claim 14, wherein said first planar surface is sloped at an angle of between 8° and 70° relative to said normal droplet path.

16. A drop-catching structure according to claim 14, wherein said droplet streams are generated under a pressure of about 15 PSI and wherein said first planar surface is sloped at an angle of between 12° and 24° relative to said normal droplet path.

17. A drop-catching structure according to claim 14, wherein said droplet streams are generated under a pressure of about 30 PSI and wherein said first planar surface is sloped at an angle of between 8° and 16° relative to said normal droplet path.

18. A drop-catching structure according to claim 14, wherein said lower planar surface is sloped at an angle of about 25° relative to said normal droplet path.

19. A drop-catching structure according to claim 14, wherein said lower planar surface and said ingesting blade define a channel for receiving said flowing layer of deflected droplets.

20. A liquid jet printing apparatus of the type generating a linear array of droplet streams under pressure and deflecting selected droplets from a normal droplet path towards a drop-catching structure according to claim 14, wherein said liquid jet printing apparatus generates said array of droplet streams under pressure through an orifice plate, said orifice plate having a linear array of orifices with diameters of 1 to 2 mils.

21. A drop-catching structure for use in a liquid jet printing apparatus of the type generating a linear array of droplet streams under pressure and deflecting selected droplets from a normal droplet path towards a drop-catching structure, said drop-catching structure comprising:

an ingesting blade, and means for defining a drop-catching structure for catching deflected droplets, said drop-catching surface including (a) an upper first planar surface sloped downwardly and in a direction toward said normal droplet path; (b) a first intermediate planar surface disposed below said first planar surface and substantially parallel to said normal droplet path; (c) a second intermediate planar surface disposed below said first intermediate surface and sloped downwardly and in a direction away from said normal droplet path; and (d) a lower planar surface disposed below said second intermediate surface and also sloped downwardly and in a direction away from said normal droplet path, said drop-catching surface being effective for carrying a flowing layer of said deflected droplets from said first planar surface to said ingesting blade.

22. A drop-catching structure according to claim 21, wherein said first planar surface is sloped at an angle of between 8° and 70° relative to said normal droplet path.

23. A drop-catching structure according to claim 21, wherein said droplet streams are generated under a pressure of about 15 PSI and wherein said first planar surface is sloped at an angle of between 12° and 24° relative to said normal droplet path.

24. A drop-catching structure according to claim 21, wherein said droplet streams are generated under a pressure of about 30 PSI and wherein said first planar surface is sloped at an angle of between 8° and 16° relative to said normal droplet path.

25. A drop-catching structure according to claim 21, wherein said second intermediate planar surface is sloped at an angle of about 25° relative to said normal droplet path.

26. A liquid jet printing apparatus of the type generating a linear array of droplet streams under pressure and deflecting selected droplets from a normal droplet path towards a drop-catching structure according to claim 21, wherein said liquid jet printing apparatus generates said array of droplet streams under pressure through an orifice plate, said orifice plate having a linear array of orifices with diameters of 1 to 2 mils.

27. A drop-catching structure for use in a liquid jet printing apparatus of the type generating a linear array of droplet streams under pressure, charging selected drops of said droplet streams, and using a first planar electrode for providing a transverse deflection field through which said droplet stream pass for deflecting selected drops away from a normal droplet path, said deflected drops being caught by said catching structure, wherein said catching structure comprises:

means defining a surface for placement in parallel confronting relationship to said first planar electrode means for substantially equalizing said transverse deflection field through which said droplet streams pass;

an ingesting blade; and means defining a catching surface joined to a lower end of said charging field equalizing surface for catching said deflected drops, said catching surface including (a) a first planar surface portion sloped downwardly and in a direction toward said normal droplet path; and (b) a second surface portion joined to said first surface to provide a backwardly disposed channel away from said normal droplet path to carry a flowing layer of deflected drops from said first surface to said ingesting blade.

28. A drop-catching structure according to claim 27, wherein said backwardly disposed channel is upwardly directed.

29. A liquid jet printing apparatus of the type generating a linear array of droplet streams under pressure and deflecting selected droplets from a normal droplet path towards a drop-catching structure according to claim 27, wherein said liquid jet printing apparatus generates said array of droplet streams under pressure through an orifice plate, said orifice plate having a linear array of orifices with diameters of 1 to 2 mils.

30. A drop-catching structure for use in a liquid jet printing apparatus of the type generating a linear array of droplet streams under pressure and deflecting selected droplets from a normal droplet path towards a drop-catching structure, said drop-catching structure comprising:

an ingesting blade, and means defining a drop-catching surface for catching deflected droplets, said drop-catching surface including (a) an upper substantially vertical first planar surface; (b) an intermediate planar surface disposed below said first planar surface and sloped downwardly and in a direction toward said normal droplet path; (c) a first convex radius surface disposed below said intermediate planar surface and in a direction downwardly and away from said normal droplet path; and (d) a second convex radius surface disposed below said first radius surface, said drop-catching surface being effective for carrying a flowing layer of said deflected droplets from said intermediate planar surface to said ingesting blade.

31. A drop-catching structure according to claim 30, wherein said intermediate planar surface is sloped at an angle of 30° relative to said normal droplet path.

32. A drop-catching structure according to claim 30, wherein said first convex radius surface has a curvature of about 0.25 inches, away from said normal droplet path.

33. A drop-catching structure according to claim 30, wherein said second convex radius surface has a curvature of about 0.06 inches.

34. A drop-catching structure according to claim 30, wherein said second convex radius surface terminates in a channel defined with said ingesting blade for receiving said flowing layer of deflected droplets.

35. A liquid jet printing apparatus of the type generating a linear array of droplet streams under pressure and deflecting selected droplets from a normal droplet path towards a drop-catching structure according to claim 30, wherein said liquid jet printing apparatus generates said array of droplet streams under pressure through an orifice plate, said orifice plate having a linear array of orifices with diameters of about 4 mils.

36. A drop-catching structure for use in a liquid jet printing apparatus of the type generating a linear array of droplet streams under pressure and deflecting selected droplets from a normal droplet path towards a drop-catching structure, said drop-catching structure comprising:

an ingesting blade, and means defining a drop-catching surface for catching deflected droplets, said drop-catching surface including (a) an upper substantially vertical first planar surface; (b) an intermediate planar surface disposed below said first planar surface and sloped downwardly and in a direction toward said normal droplet path; (c) a lower planar surface disposed below said intermediate surface and sloped downwardly and in a direction away from said normal droplet path; and (d) a tight-radius surface disposed below said lower planar surface and being curved in a direction away from said normal droplet path said drop-catching surface being effective for carrying a flowing layer of said deflected droplets from said lower planar surface to said ingesting blade.

37. A drop catching structure according to claim 36, wherein said tight-radius surface is sloped at an angle of 30° relative to said normal droplet path.

38. A drop-catching structure according to claim 36, wherein said tight-radius surface has a curvature of about 0.10 inches radius in a direction away from said normal droplet path.

39. A drop-catching structure according to claim 36, wherein said tight-radius surface terminates in a channel defined with said ingesting blade for receiving said flowing layer of deflected droplets.

40. A liquid jet printing apparatus of the type generating a linear array of droplet streams under pressure and deflecting selected droplets from a normal droplet path towards a drop-catching structure according to claim 36, wherein said liquid jet printing apparatus generates said array of droplet streams under pressure through an orifice plate, said orifice plate having a linear array of orifices with diameters of about 4 mils.

* * * * *